United States Patent [19]

van der Lely

[11] 4,149,359
[45] Apr. 17, 1979

[54] MOWING MACHINE

[76] Inventor: Cornelis van der Lely, 7, Brüschenrain, Zug, Switzerland

[21] Appl. No.: 722,510

[22] Filed: Sep. 13, 1976

[30] Foreign Application Priority Data

Sep. 11, 1975 [NL] Netherlands ................. 7510686

[51] Int. Cl.² ............................................. A01D 35/26
[52] U.S. Cl. ........................................ 56/13.6; 56/295
[58] Field of Search ................ 56/295, 13.5, 13.6, 56/192, 12.7

[56] References Cited

U.S. PATENT DOCUMENTS 3,462,926   8/1969   Webster et al. ................ 56/13.6

FOREIGN PATENT DOCUMENTS 1813610   7/1969   Fed. Rep. of Germany ............. 56/295

*Primary Examiner*—Russell R. Kinsey
*Attorney, Agent, or Firm*—Penrose Lucas Albright; William B. Mason

[57] ABSTRACT

A mowing machine is connectable to a tractor's lifting hitch and power take-off shaft. A row of rotors is mounted along the length of a laterally extending support plate that is pivoted to the main frame. Each rotor includes a hub and cutter member assembly on an upwardly extending shaft engaged by a driving assembly. The driving assembly can be an elongated shaft that passes through a gear box for each rotor that is fastened to the support plate or a series of meshed gear wheels housed as a readily replaceable unit in a gear box and journalled to the support plate. The assembly includes a single blade pivoted to each hub eccentric with respect to the axis of rotation of the respective rotor and a counter balancing component. Reduction gearing interconnects the power take-off shaft to the shafts of the rotors through a main gear box to revolve their blades at high rates of speed, i.e. at least 6000 and preferably 8000 to 10,000 r.p.m. The blades of neighboring rotors can be rotated in the same or in relative opposite directions.

21 Claims, 10 Drawing Figures

MOWING MACHINE

SUMMARY OF THE INVENTION

This invention relates to mowing machines of a type comprising a plurality of power-driven rotors arranged in an adjacent relationship, each rotor having a corresponding single cutting member or blade.

One object of the invention is to provide a mowing machine with a high freedom of construction, particularly with regard to the relative disposition of the cutting members or blades.

According to one aspect of the invention, there is provided a mowing machine of the kind set forth, wherein two neighbouring rotors each having a single cutting member, said rotors being revolved in the same direction during operation of the machine.

For a better understanding of the invention, and to show how the same may be carried into effect, reference will now be made, by way of example, to the accompanying drawings, in which:

BRIEF DESCRIPTION OF THE DRAWINGS

FIG. 9 is a plan view, similar to FIGS. 5 and 7, which illustrates a third embodiment of part of the mowing machine, and FIG. 10 is a section taken on a line X—X in FIG. 9.

DESCRIPTION OF THE PREFERRED EMBODIMENTS

Figure 1:
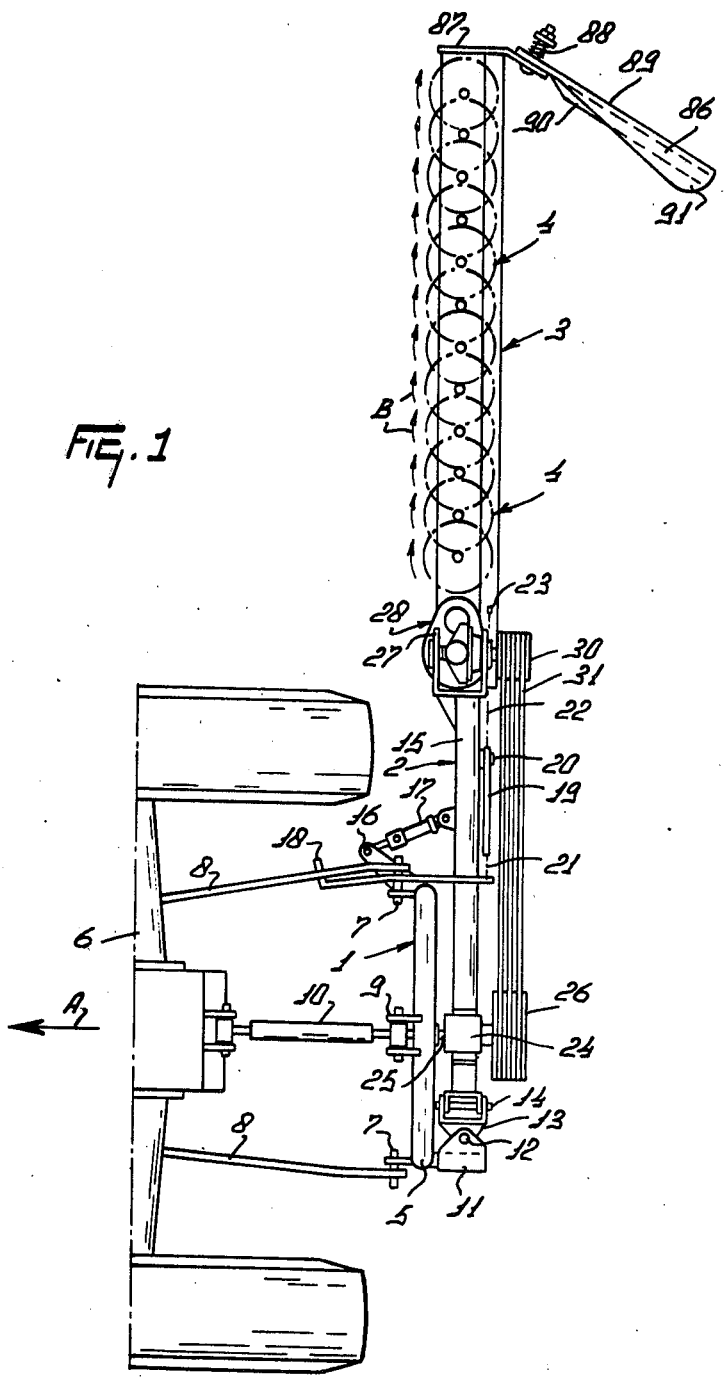
FIG. 1 is a plan view of a mowing machine in accordance with the invention connected to the rear of an agricultural tractor.

Referring to FIGS. 1 to 6 of the drawings, the mowing machine principally comprises a fastening portion 1, a supporting member 2 and a supporting beam 3 carrying a plurality of rotors 4 (FIG. 1). The fastening portion 1 is afforded principally by a coupling member or trestle 5 shaped in the form of an inverted V or U, as seen in rear elevation, the plane of symmetry of which substantially coincides, during operation, with a longitudinal plane of substantial symmetry of a tractor 6 or other operating vehicle of the machine. Near the lower free ends of the coupling member or trestle 5 horzontal pins 7 that extend perpendicular to the intended direction of operative travel A of the machine are passed through holes provided near the hindmost ends of lower lifting arms 8 of a three-point lifting device or hitch of the tractor 6 or other vehicle whereas, near the top of the coupling member or trestle, fastening means in the form of lugs 9 can be coupled with the hindmost end of an adjustable top rod 10 of the lifting device or hitch of the tractor 6 or other vehicle. During operation, the coupling member or trestle 5, formed by a curved tubular beam, extends with its general plane substantially vertically perpendicular to the direction A. However, this position may be varied because the length of the top rod 10 is adjustable. Near one of the lower free ends of the coupling member or trestle 5, a fork 11 is fastened behind said trestle, viewed in the direction of travel A, said fork 11 comprising two parallel, substantially horizontal plates spaced one above the other, each plate having a hole registering with that of the other plate, a line containing the centers of the two holes extending upwardly, in general, at a small angle to the vertical and parallel to the general plane of the coupling member or trestle 5, said line being located in a vertical plane that is parallel to the direction A. The line in question coincides with the axis of a pivotal shaft 12, which shaft extends, during operation, almost vertically upwards from its lower end but slightly forwards with respect to the direction A. The pivotal shaft 12 is located behind the coupling member or trestle 5 and near one of the lower free ends thereof. A coupling member 13 is pivotable around the pivotal shaft 12 which member 13 serves as a bearing for a pivotal shaft 14, disposed at a short distance from the pivotal shaft 12 but arranged with its axis in non-intersecting perpendicular relationship with the axis of the pivotal shaft 12. The pivotal shaft 14 is located, viewed from the rear of the machine, between the pivotal shaft 12 and the vertical, longitudinal plane of substantial symmetry of the tractor 6 or other vehicle. The pivotal shaft 14 holds a pivotable supporting tube 15 which is connected with the coupling member or trestle 5 through the universal joint afforded by the pivotal shafts 12 and 14. From the area located at the side of said plane of substantial symmetry of the tractor or other vehicle at which the fork 11 is disposed, the supporting tube 15 extends across said plane of substantial symmetry towards the area on the other side thereof approximately up to a vertical boundary plane of the tractor 6 or other vehicle extending in the direction A remote from the fork 11 while, during operation, as viewed in plan, the supporting tube 15 is at right angles to the direction A but is inclined downwardly away from the fork 11 when the machine is viewed from the rear.

The lower free end of the coupling member or trestle 5 that is remote from the fork 11 is provided with a horizontal extention arm 16 extending forwardly in a laterally inclined position. Between the free leading end of said extention arm 16 and the supporting tube 15, there is provided a safety device 17 which prevents rearward angular displacement of the supporting member 2 during normal operation of the machine but which, in the event of a predetermined resistance to forward progress of the supporting beam 3 or the rotors 4 being exceeded, allows rearward yielding of the supporting member 2 and the supporting beam 3 to take place about the pivotal shaft 12. The safety device 17 is of a construction which is known per se. The pin 7 that is farthest from the fork 11 allows pivotal movements of a rocker 18 which is mounted thereon. The leading end of the rocker 18 is disposed, during operation, beneath the adjacent lifting arm 8, said rocker being bent over upwardly in a rearward direction so that the hindmost end thereof is located at a distance above the supporting tube 15. A lever 19 is pivotable about a substantially horizontal shaft 20 extending in the direction A at the rear of the supporting tube 15, and the ends of the substantially L-shaped lever 19 are connected by bars, chains or the like 21, 22 with the rearmost end of the rocker 18 and the topmost free end of an upwardly extending lug 23 rigidly secured to the neighboring end of the supporting beam 3. The supporting tube 15 is provided with a substantially cylindrical housing 24 which comprises the bearings of a rotary input shaft 25 and which is so disposed that its horizontal axis of symmetry is located in the vertical plane of substantial symmetry of the tractor 6 or other operating vehicle. The output shaft of the housing 24 is located, as seen in plan, behind the supporting tube 15 where it is provided with a multiple pulley 26 which is arranged to revolve about an axis that is parallel to the axis of the pivotal shaft 14. The end of the supporting tube 15 which is remote from the fork 11 is provided with a fork member 27 in which a gear box 28 is pivotably journalled by means of a shaft 33 having an axis coinciding with axis 29 extending parallel to the axis of the pivotal shaft 14. The gear box 28 and the supporting beam 3 which is rigidly secured thereto are thus pivotable together about the shaft 33 with respect to the supporting tube 15 of the supporting member 2. The gear box 28 is provided at the rear with a smaller multiple pulley 30, which is constructed to match the pulley 26 and is arranged relative thereto in such a way that the grooves in the two pulleys that are intended to receive the same belt are spaced apart by equal distances from a plane at right angles to their parallel axes of rotation. In this embodiment, the pulleys 26 and 30 each have three grooves suitable for receiving cooperating V-belts 31.

The gear box 28 (FIGS. 2, 3 and 4) is pivotably journalled in the fork member 27 by means of a stub shaft 32 and shaft 33 the axes of which are in alignment and both of which coincide with the pivotal axis 29. The pulley 30 is keyed to the rear end of the shaft 33 with respect to the direction A. The stub shaft 32 is rigidly secured in the gear box 28 and projects a distance from the front of the box 28. The stub shaft 32 is journalled in a manner not illustrated, in a bearing plate 34 which is fastened by bolts 35 to one of the arms of the fork member 27. The shaft 33 is journalled in bearings 36 in the gear box 28, said bearings 36 being arranged in a bearing housing 37 which is secured by bolts 38 to the gear box 28. The rear of the bearing housing 37 has an arm of the fork member 27 connected to it so that relative turns are possible. In order to fix in place the rearmost bearing 36, considered in the direction A, with respect to the gear box 28, a pressure ring 39 is fastened by bolts 40 to the rear of the bearing housing 37. The shaft 33 projects from the front of the bearing housing 37 and is provided at that end with a bevel gear or pinion 42 fastened by means of splines 41 and a circlip. A shaft 43 is disposed in front of the gear 42 in the gear box 28, the axis of said shaft 43 intersecting the pivotal axis 29 at right angles and being contained in a vertical plane that is parallel to the direction A. Near its top end, the shaft 43 has splines 44 for receiving a bevel gear or pinion 45 which is in mesh with the gear or pinion 42. The bevel gear wheel 45 is journalled in a bearing 46 mounted in the top of the gear box 28. The gear box 28 is closed on top by a cover plate 47 which is fastened by bolts 48 to the remainder of the gear box 28. The transmission ratio between the gears 42 and 45 is such that the shaft 43 has a considerably higher speed of revolution than does the shaft 33. Near the bottom of the gear box 28, the shaft 43 has splines 49 receiving spur gear or pinion 50. The gear or pinion 50 and the lower end of the shaft 43 are journalled in the base of the gear box 28 by a bearing 51.

Figure 2:
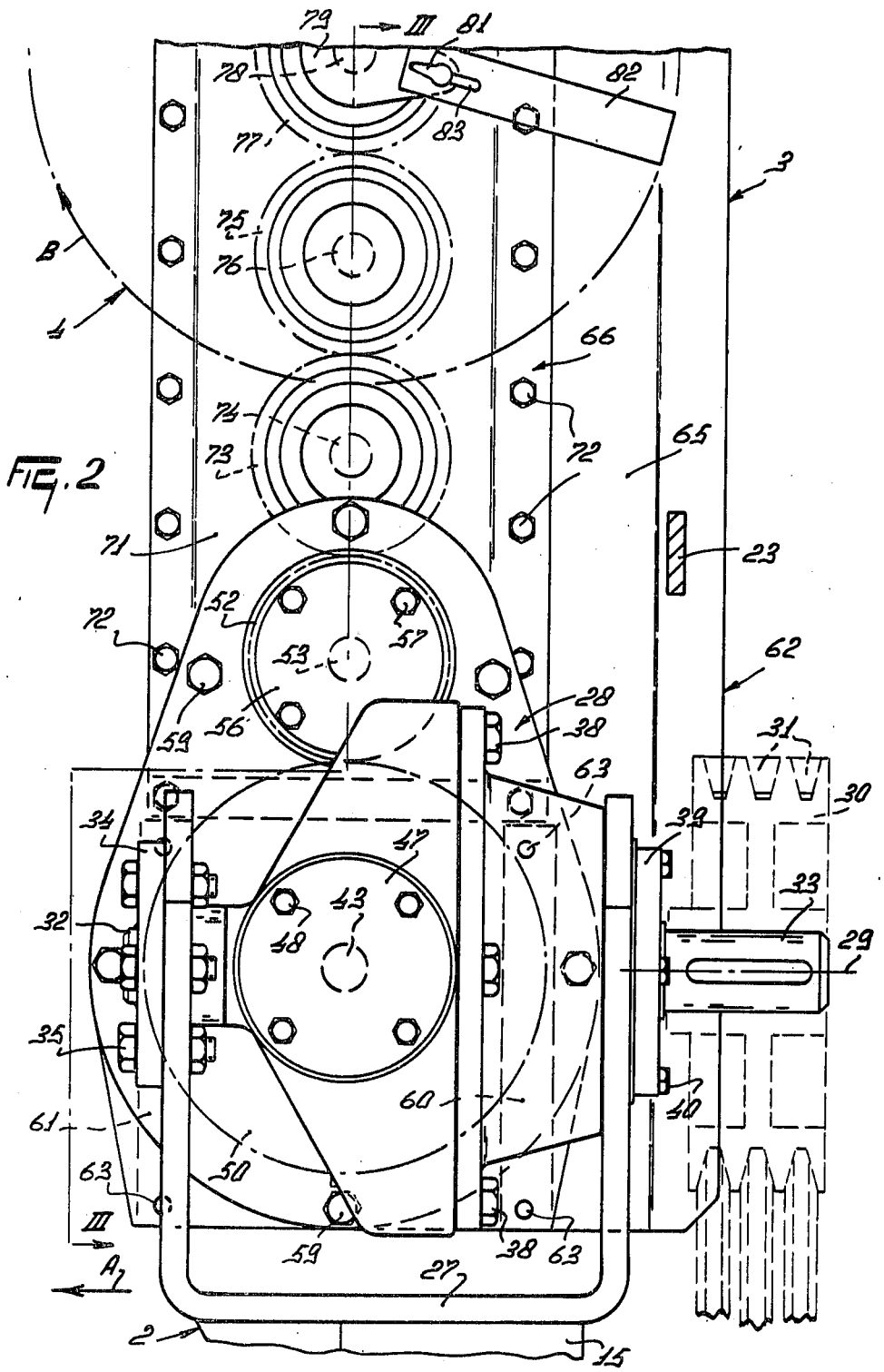
FIG. 2 is an enlarged plan view of parts of a driving gear of the machine.
Figure 3:
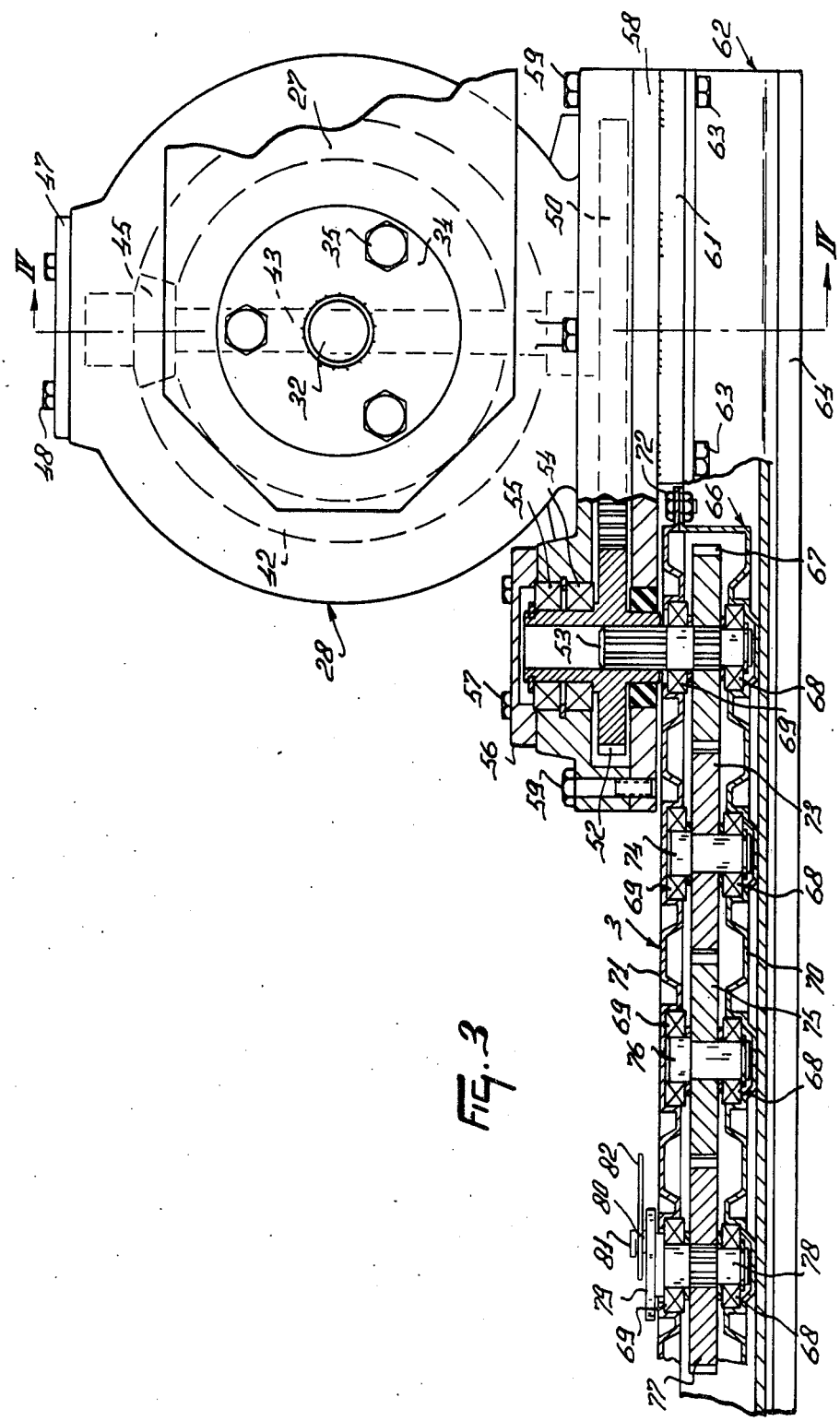
FIG. 3 is a sectional view taken along line III—III in FIG. 2.
Figure 4:
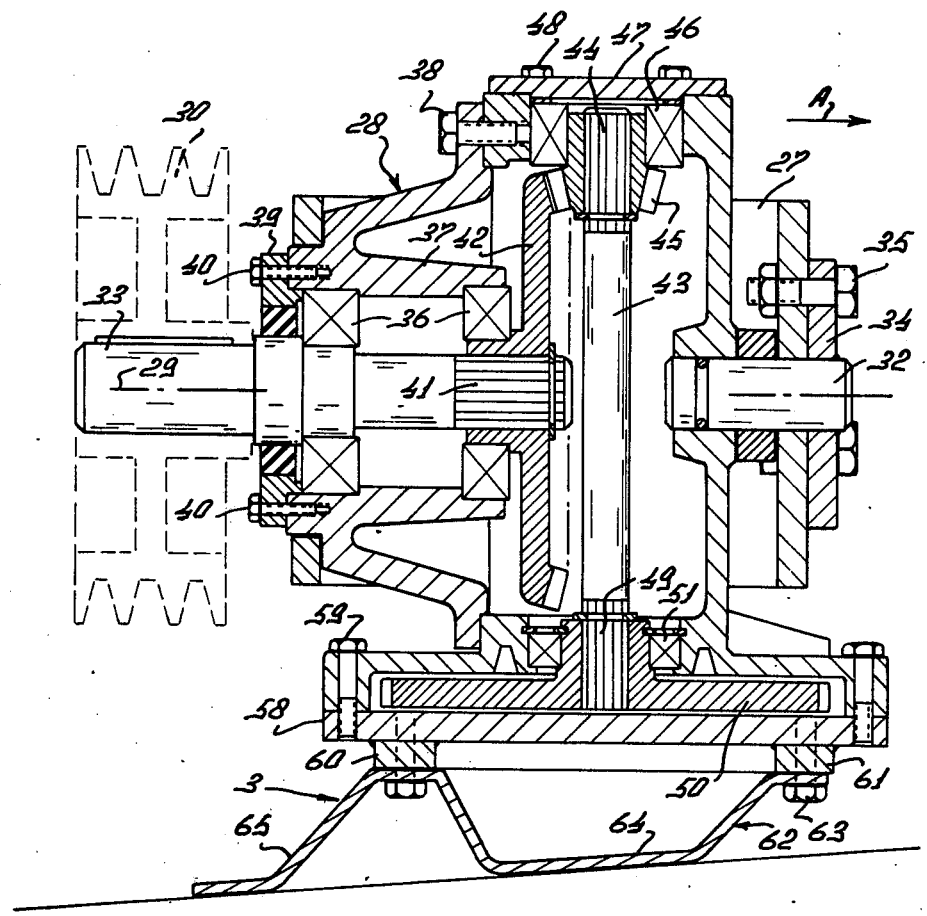
FIG. 4 is a section taken on a line IV—IV in FIG. 3.

Near its base, the gear box 28 projects horizontally towards the supporting beam 3 (FIGS. 2 and 3). Viewed in plan, the bottom of the gear box 28 (see FIG. 2) has a substantially pear-shaped form accommodating spur gear or pinion 50 which is of comparatively large diameter and that is in mesh with a smaller spur gear 52. The gear 52 is axially displaceable on a shaft 53 (FIG. 3), the axis of which is parallel to the axis of the shaft 43. The gear 52 is journalled in the top of the portion of the gear box 28 which projects towards the supporting beam 3 by bearings 54 and 55, the top of the gear box 28 being closed by a cover plate 56 having a circular shape, viewed in plan, which cover plate is secured to the gear box 28 by bolts 57. The gear box 28 is closed at the bottom by a plate 58 which is fastened by bolts 59 to the base of the gear box 28. The lower surface of plate 58 is provided with two supports 60 and 61 extending substantially perpendicular to the direction A.

The lower surfaces of the supports 60 and 61 have secured to them a single mounting or support plate 62, of substantially rectangular shape when viewed in plan (FIGS. 2, 5), by bolts 63. Support plate 62 principally constitutes the supporting beam 3 and extends, viewed in plan, outwardly from the side of the gear box 28 facing the tractor 6 or other vehicle in a lateral direction over a distance of substantially two meters, the fore and aft width of the plate being about twenty centimeters. In a sectional view (FIG. 4), the support plate 62 has a substantially gutter- or channel-shaped portion 64. The overall width of the channel-section portion 64 is about fifteen centimeters. The ground-contacting portion of support plate 62 that is afforded by the bottom of the portion 64 extends rectilinearly and horizontally over a predetermined distance and, at the front, support plate 62 is bent upwardly at an angle of about 45°, while portions at the edges of the limbs of the channel-section portion 64 are bent so that they are located in the same plane which is at an angle of about 5° to the horizontal, said angle being, however, adjustable with the aid of the aforementioned top rod 10. The coplanar portions of the top surface of the mounting plate 62 serve to secure it to the supports 60 and 61 so that the shaft 43 and the parallel shafts are at an adjustable angle of about 85° to the horizontal. Behind its rearmost, upper portion, the support plate 62 extends downwardly at an angle of about 50° to the horizontal and the extreme rearmost lower portion of support plate 62 constitutes a stabilizing portion 65 which slides along the ground during operation. The channel-section portion 64 of the plate 62 receives a driving gear assembly or transmission in the form of a gear box 66 covering substantially the whole length of the plate 62 and serving to enclose the drive to the rotors 4, while it completely covers the plate 62. At the end facing the tractor 6 or other vehicle the gear box 66 comprises a spur gear 67 which is rigidly secured to the shaft 53 and which, near the lower end thereof, is supported in bearings 68 and 69 in the gear box 66. In order to ensure an effective support for the bearings 68 and 69, the gear box 66 is provided with a profiled lower portion 70 and with a profiled top portion 71 matching the bearing 69, said portions 70 and 71 being fastened to one another by bolts 72 on either side of the channel-section portion 64 of support plate 62. The gear box 66 is secured in place on support plate 62 with the aid of the same bolts 72. The level of the substantially straight upper rim of support plate 62 is preferably chosen so that the top of each gear inside the gear box 66 does not project above said rim. It should be noted that the gear box 28 can be joined to the lower portion 70 of the gear box 66 in a simple manner. Since the shaft 53 is preferably displaceable with respect to the gear 52, these two portions of the machine can be disconnected from one another after releasing the bolts 63.

As seen in the sectional view of FIG. 3, the gear 67 meshes with a spur gear 73 disposed in the gear box 66 on a shaft 74 which is rotatably supported, like the shaft 53, in a bearing 69 in the top portion 71 of the gear box and in a bearing 68 in the lower portion 70 thereof. Like the gear 73, a spur gear 75 meshing with the former is fastened to a shaft 76, which shaft 76 is supported in bearings 68 and 69 in the gear box 66.

The gear 75 is drivably connected with a further spur gear 77 fastened to a shaft 78, which shaft 78 is journalled in bearings 68 and 69 in the lower and top portions 70 and 71 respectively of the gear box 66. The shaft 78 extends, as seen in FIG. 3, upwardly to a location above the gear box 66. The axes of the shafts 78, 76, 74 are parallel to the axis of the shaft 53 and hence of the shaft 43. During operation, the shaft 78 is thus slightly inclined to the front, its axis being at an angle of substantially 5° to the vertical in a plane parallel to the direction A. The shaft 78 is provided with a hub or supporting member 79, which is preferably manufactured from plate material, arranged to rotate in the direction of an arrow B and principally forming one of the rotors 4 of the mowing machine, said rotor 4 having, viewed in plan (FIG. 5), a substantially pear-shaped or keyhole-shaped form, the broader part surrounding shaft 78. Near the comparatively narrow tip of the hub 79 of the rotor 4 that is furthest remote from the shaft 78 a cam or pin 80 is provided which has, at its top, a wide end portion 81 extending parallel to the hub 79 and over a distance in the direction of the shaft 78. Pin 80 is arranged at such a place on the hub 79 that, considered in the direction A, the path described by pin 80 is located wholly behind the front of the support plate 62. Pin 80 is a fastening member for a cutting member or blade 82 and, owing to the pivotal joint, the pin 80 also forms a pivotal shaft. The cutting member or blade 82 is made from sheet material having a thickness of one to one and one-half millimeters, preferably spring steel, which may be hardened at the cutting edges with regard to the cutting function. For connection to pin 80, the lightweight cutting member or blade 82 has a small slot shaped so that the cutting member 82 can be slipped downwardly over the wide end portion 81 of pin after which it can be moved into a working position by turning it through about 180°. Thus pin 80 and the portion 81, together with the slot 83, constitute a so-called bayonet joint. The cutting member or blade 82 has a length of about ten centimeters and extends away from the axis of pin 80 to the leading edge of the gear box 66, which is straight as viewed in plan, and over a distance forwardly beyond said edge. Said length is not less than the distance between the center line of the shaft 78 and 80. Thus, the cutting member or blade 82 is freely pivotable with respect to the rest of the rotor 4 and can be readily mounted on the hub 79. In order to ensure effective use of the cutting member or blade 82, it may have, near the end thereof remote from pin 80, a further slot so that, after its leading cutting edge is blunted, it can again be used in a position turned through 180° in which it presents a fresh sharp cutting edge to material that is to be mown.

The gear 77 is drivingly in mesh with a further spur gear 84 arranged in the gear box 66 on a shaft 85 which is journalled, like the shafts 76 and 74, in the lower and top portions of the gear box 66. The gear 84, serves as an intermediate gear between the gear 77 and the like gear wheel 77 of a neighboring rotor hub 79, said gear 77 being furthermore drivingly in mesh with a further gear 84, said sequence of gears gears 77 and intermediate gear gears 84 being repeated to cover the whole working width of the mowing machine. The neighboring rotor hubs 79 are provided in the same manner with cutting members or blades 82. Owing to the intermediate gears 84 between the gears 77, the rotors 4 of the mowing machine will all rotate in the same directions that are indicated by the arrows B. It should be noted that, viewed in plan, neighboring rotor hubs 79 (FIG. 5) are disposed relative to one another so that vertical planes of symmetry of neighboring boring cutting members or blades 82 are at acute angles of about 35° to 60°, preferably substantially 48° to 50° to one another. Owing to said angles, the neighboring cutting members or blades 82 are staggered and have a predetermined phase difference during use which avoids jerky operation.

In the gear box 66 in the supporting beam 3, supported from support plate 62, twelve gears 77 mounting thereabove twelve rotor hubs 79 are fastened in the manner described above, said gears 77 being drivably in mesh via the intermediate gears 84, while the cutting members or blades 82 of the successive rotors 4 are at acute angles to one another as stated above.

Figure 5:
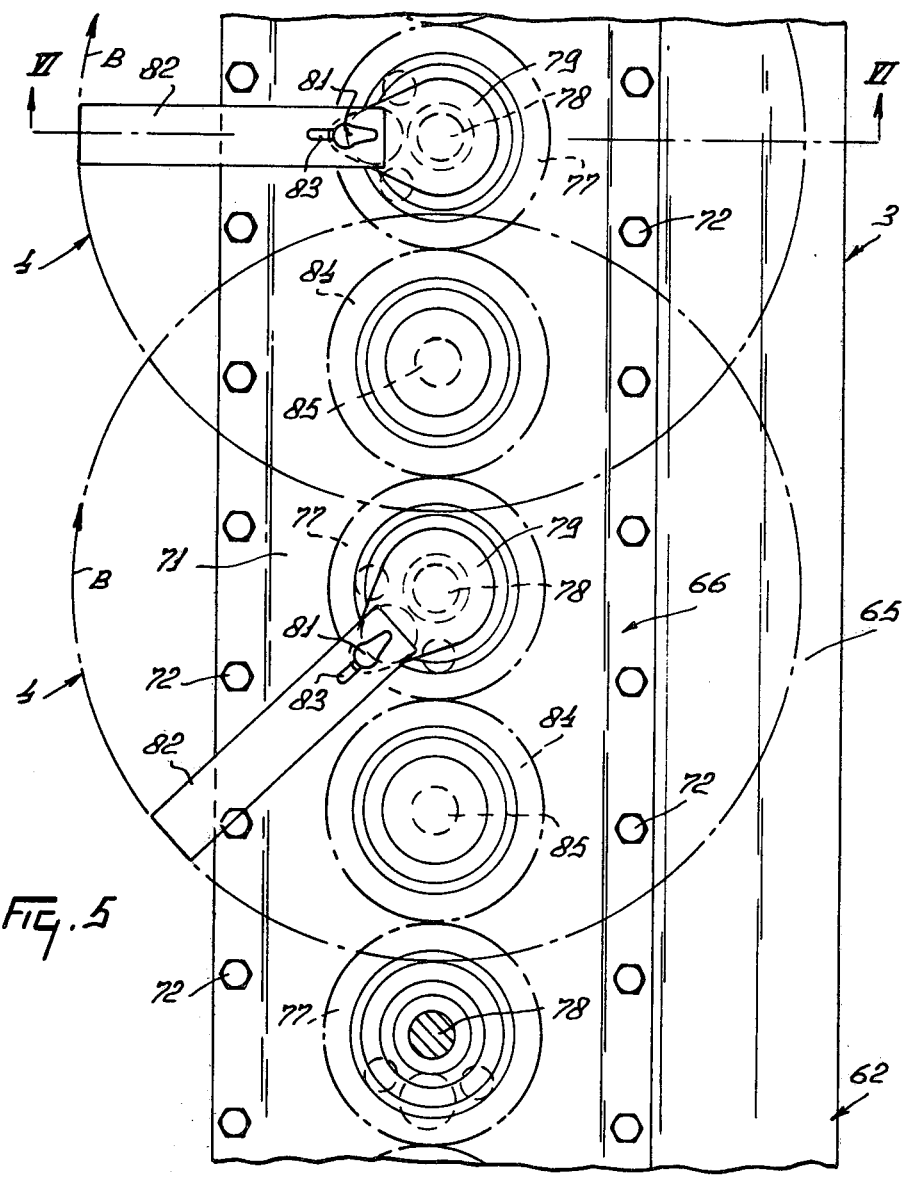
FIG. 5 is a plan view, to an enlarged scale, of parts of the mowing machine of FIG. 1.
Figure 6:
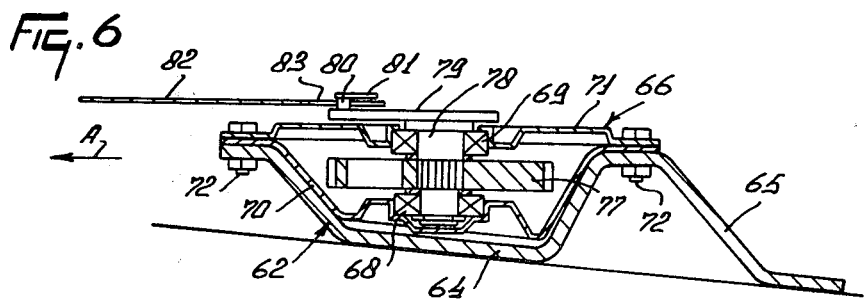
FIG. 6 is a section taken on a line VI—VI in FIG. 5.

Despite the comparatively small weight of each cutting member or blade 82, which has a volume of substantially two cubic centimeters for a thickness of about one millimeter and a length of ten centimeters, it may be advantageous to balance the rotors 4. In order to obtain such a distribution of the weight of each rotor 4 and of its associated cutting member or blade 82 that the rotor and its cutting member or blade are at least substantially rotationally balanced, it is preferred to remove a quantity of material from the portion of each gear 77 that is located beneath pin 80 of the rotor 4 concerned (FIGS. 5 and 6). As a matter of course, balancing may also be ensured on each rotor hub 79 itself, for example, by arranging small weights on the side of the hub 79 remote from pin 80. The same applies to the side of the corresponding gear 77 that is remote from pin 80.

The cutting length of each blade 82 is such that neighboring blades 82 have the maximum potential overlap. The transmission ratio between gears 42, 45, 50, 52 is such that the rotors 4 are driven with very high speed. On the basis of a speed of revolution of the power take-off shaft of the tractor 6 or other vehicle connected with the shaft 25 of 540 revs./min., the rotors 4 are driven at the rate of 6000 revs./min. By choosing a different transmission ratio in the housing 24 and/or in the gear box 28, the rotors 4 of the mowing machine embodying the invention can be driven at a rate of 8000 to 10,000 revs./min. On the basis of a diameter of the paths described by the outer ends of the cutting members or blades 82 of about twenty-five centimeters, the cutting speed of the blades 82 amounts to about 75 ms./sec. at the rate of 6000 revs./min. With 8000 revs./min. said cutting speed is about 100 ms./sec. and with 10,000 revs./min. it is about 125 ms./sec. It should be noted that the blades 82 cut the crop without needing to co-operate with any further means.

The cutting length of the blades 82 is chosen to be large as compared with the sizes of the rotor hubs 79. Owing to the distance between the axes of the shafts 78 of fifteen in this embodiment and to the lengths of the cutters of about ten centicentimeters, a maximum overlap between neighboring mowing circles can be obtained with comparatively small rotors 4. In the plan view of FIG. 5, the maximum overlap has a value of substantially ten centimeters.

The effective working width of the machine shown in FIGS. 1 to 6 amounts to about two meters. Since all of the rotors 4 revolve in the direction of the arrows B, the crop is thrown laterally and to the rear. For guiding this crop, a swath board 86 is fastened to the outer end of the supporting beam 3 (FIG. 1) while, with the aid of a support 87 extending to directly behind the rear rim of the supporting beam 3, the swath board 86 is inclined inwardly. By means of a spring structure 88 arranged on the outer rear side of the ridge 87, the swath board 86 can deflect resiliently. The swath board 86 comprises a vertical plate 89 the lower edge of which slides along the ground in operation at which place it is provided with a horizontally bent-over flange 90 extending away from the plate 89 towards the rotors 4. On the top of the plate 89, a flange 91 is disposed in a similar manner, the flange 91 also extending horizontally towards the rotors 4. The flange 91 has, viewed in plan, a substantially triangular shape, its largest width being located near the rear end of the plate 89 where it is locally larger in width than the underlying flange 90.

Figure 7:
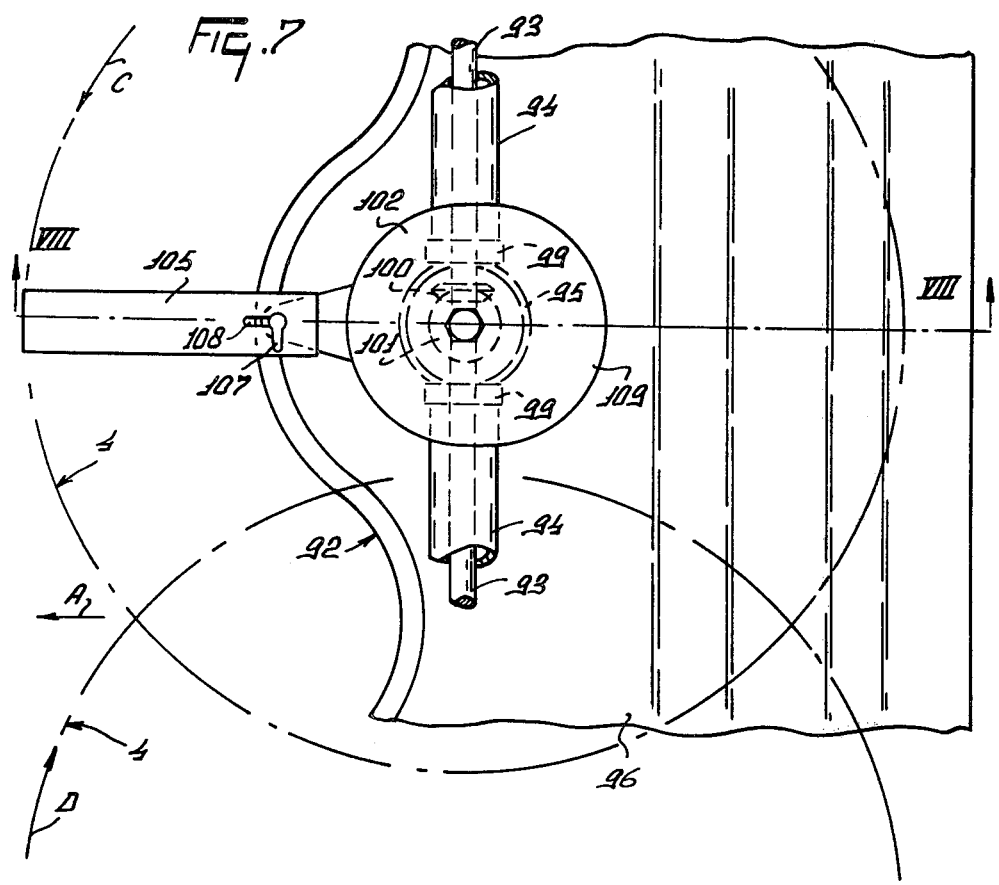
FIG. 7 is a plan view similar to FIG. 5 which illustrates a second embodiment of part of the mowing machine.
Figure 8:
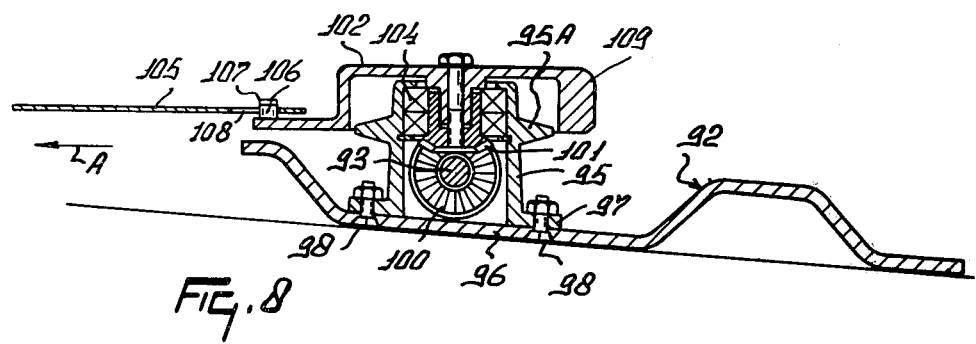
FIG. 8 is a section taken on a line VIII—VIII in FIG. 7.

In the second embodiment of the mowing machine shown in FIGS. 7 and 8, the driving gear assembly or transmission is arranged on a mounting plate 92 and comprises not only gears but also a shaft 93 extending longitudinally of the supporting beam 3 in a substantially cylindrical tube 94. In this embodiment, the shaft 93 has a diameter of about ten millimeters. The driving gear assembly comprises a gear box 95 beneath each rotor 4A. Each gear box 95 is arranged near the bottom on a gutter-shaped or channel-shaped portion 96 of plate 92 so as to be individually detachable. Each gear box 95 is provided near its bottom with a portion 97 having, as viewed in plan (FIG. 7), an annular shape, said portion 97 being secured by bolts 98 to the bottom of support plate 92 in the area of the gutter-shapd or channel-shaped portion 96. The driving shaft 93 is of circular section and is driven, in this embodiment, in a manner that is not illustrated, from the side of the gear box 28 with the aid of intermediate gears, the driving shaft 93 providing the drive to all of the rotors 4 of the mowing machine. The driving shaft 93 is passed with the aid of a connecting sleeve through an opening in the housing of each gear box 95 and is journalled in bearings 99. Inside each gear box 95, the driving shaft 93 is provided with a gear 100, which is preferably a bevel gear and which is preferably integral with the shaft 93, said gear 100 engaging a bevel gear 101, to which a rotor is secured and has a center line or axis 103 which intersects the center line or axis of the driving shaft 93 at right angles. The center line or axis 103 extends upwardly and occupies, during operation, the same position as the center line or axis of each shaft 78 in the preceding embodiment. Each rotor has a hub 102 journalled by bearings 104 in the corresponding gear box 95. Each rotor hub 102 has a cylindrical outer circumference, but its cross-sectional shape suits the fastening of only one cutting member or blade 105 which is similar or substantially similar to the cutting members or blades 82 of the first embodiment. Each cutting member or blade 105 is fastened to the corresponding rotor hub 102 with the aid of a pin 106 which has a widened portion 107 near the top and which is shaped so that the cutting member or blade 105 can be mounted in a simple manner. In this embodiment, the widened portion 107 preferably extends substantially tangentially to the axis of rotation of the rotor and a bayonet joint is formed for the cutting member or blade so that, during mounting, the cutter or blade can be turned through 90°. For this purpose the blade has an appropriate elongated opening or slot 108 corresponding with the opening 83 of FIG. 5. In order to avoid an excessive unilateral load of the cutter or blade 105 on the rotor hub 102, balancing means are arranged on the rotor hub at the side thereof remote from pin 106, said balancing means preferably being formed by a weight 109. This weight 109 can be simply provided by casting it integrally with the rotor hub 102. The front of the gutter-shaped or channel-shaped portion 96 is preferably undulated in this embodiment, which is allowed by the small diameter of the driving shaft 93, which leaves space for providing the sinusoidal shape. The interior of each hub 102 is substantially closed by a corresponding ridge or flange 95a.

Figures 9, 10:
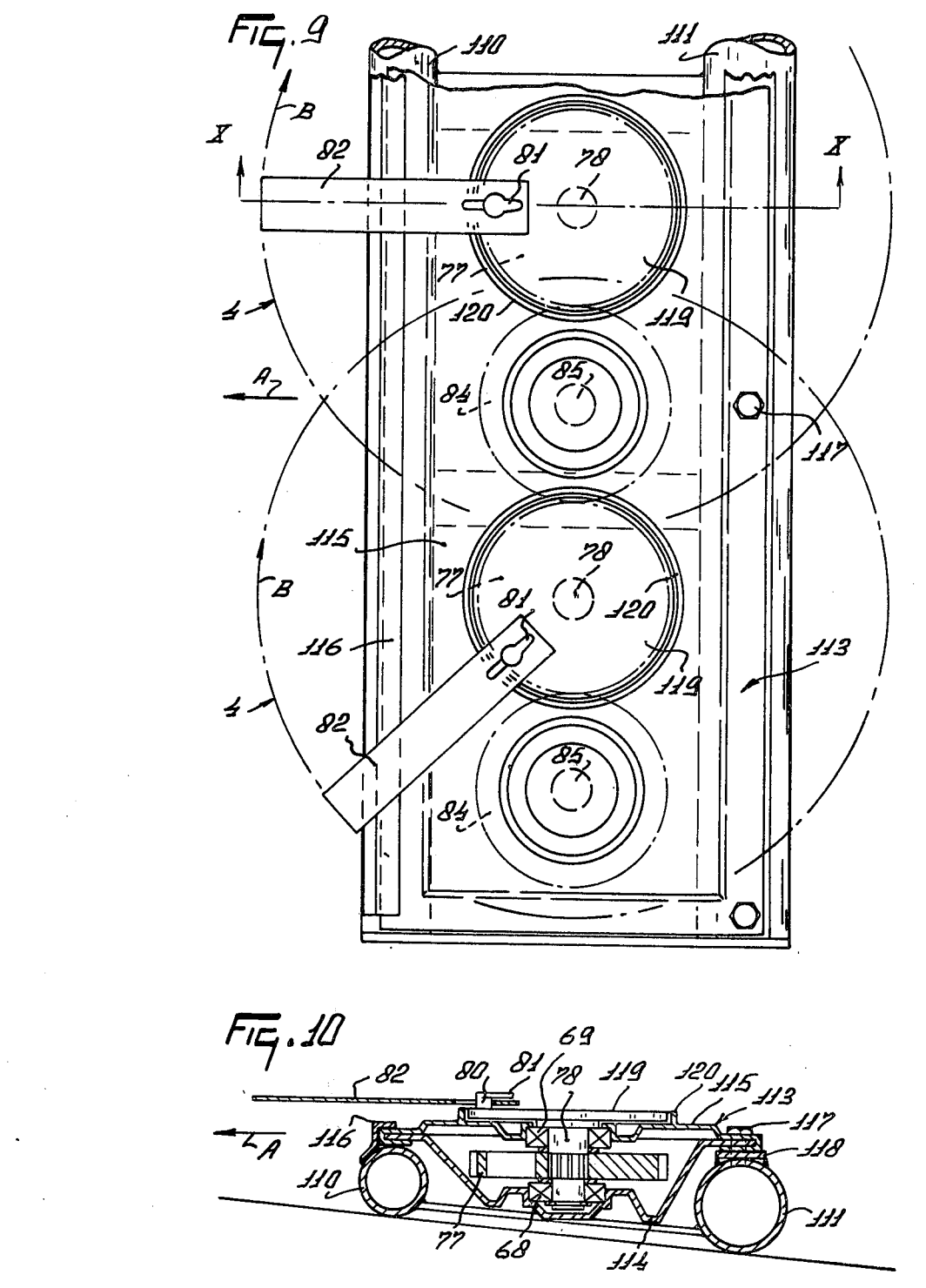

In the third embodiment of a mowing machine in accordance with the invention that is illustrated in FIGS. 9 and 10, support plate 62 of the first embodiment is replaced by tubular supporting portions 110 and 111. The portion 110 is preferably formed by a tube covering the whole working width of the mowing machine. As compared with the tubular portion 111 which also covers the whole working width of the mowing machine, said portion 110 preferably has a diameter which is slightly less than 70% of the diameter of the tubular portion 111. The tubes 111 and 110 are interconnected near the bottom by equally spaced transverse portions 112. Between the tubes 110 and 111 there is arranged a driving gear assembly or transmission comprising a gear box 113 which substantially corresponds to the gear box 66 of the first embodiment. Said gear box 113 comprises a lower portion 114 and a top portion 115. The gear box 113 of this embodiment is completely closed. For this purpose the top portion 115 is bent near its rim around the portion 114. The gear box 113 is, therefore, mounted as a single unit and can, if necessary, be replaced as a single unit. In order to permit ready mounting of the gear box 113, the top of the tube 110 is provided with a bent angle-section iron or steel bar 116 by welding, which bar embraces the foremost edge portion of the gear box 113 with respect to the direction A. The gear box 113 is secured to the tube 111 in a conventional manner, as shown in the first embodiment, by bolts 117. In order to ensure satisfactory mounting, the tube 111 is provided on top with a flat strip 118 on which the rearmost portion of the gear box 113 can be arranged in a simple manner. The gear box 113 accommodates a driving mechanism substantially corresponding with the driving mechanism of the first embodiment. Corresponding parts are designated by the same numerals.

The top of each shaft 78 is provided with a rotor hub 119 and neighboring rotors 4 have the same direction of rotation indicated by the arrow B owing to the use of the intermediate gears 84. Each rotor hub 119, which is preferably flat and circular as seen in plan, is provided at a point near its circumference with one of the previously described pins 80 and with a widened portion 81. The cutting member or blade 82 is connected thereto in the same manner as for the first embodiment. As in the first embodiment, the gear 77 located beneath each blade 82 also has one or more bores ensuring the balance of the assembly of blade and rotor hub during operation. In order to prevent grass cuttings or any foreign material or both from getting in between each rotor hub 119 and the gear box 113, the rotor hubs 119 are each concentrically surrounded by an upright rim 120 extending, preferably, to just beneath the corresponding cutting member or blade 82.

Although certain features of the mowing machines described illustrated in the accompanying drawings will be set forth in the following claims as inventive features, it is emphasized that the invention is not necessarily limited to those features and includes within its scope each of the parts of each mowing machine that has been described, or illustrated in the accompanying drawings, or both, individually and in various combinations.

What we claim is:

1. A mowing machine comprising a frame having coupling means for connection to a p.t.o. of a prime mover, a supporting beam means and a plurality of rotors being mounted on said supporting beam means, said supporting beam means extending laterally from said coupling means, said rotors being rotatable about corresponding upwardly extending axes that are substantially parallel to one another and driving means connected to rotate said rotors about their axes, said driving means including gears that transmit a relative high speed of rotation from the p.t.o. to said rotors, said rotors each having a single cutting member extending outwardly with respect to the respective axis of rotation, each said rotor comprising balancing means balancing the center of gravity of said rotor with said cutting member with respect to the axis of rotation of said rotor, the cutting members of adjacent rotors being revolved in the same direction by said driving means.

2. A mowing machine as claimed in claim 1, wherein said cutting member is freely pivotable about a pivot axis that is spaced from the axis of rotation of the corresponding rotor.

3. A mowing machine as claimed in claim 2, wherein said pivot axis is defined by a pivot on a hub and said hub is mounted on the top of a shaft of said rotor, said shaft being directly connected to the driving means.

4. A mowing machine as claimed in claim 3, wherein each cutting member is a blade with an effective length greater than its width, said length of said blade, measured from its corresponding pivot to the outer free end thereof is not less than the distance between said pivot and the axis of rotation of the shaft of the corresponding rotor.

5. A mowing machine as claimed in claim 4, wherein said blade is spring steel having a thickness of about one millimeter.

6. A mowing machine as claimed in claim 4, wherein said pivot is a bayonet joint, which comprises an elongated slot adjacent the inner end of said blade that cooperates with a pin on said hub.

7. A mowing machine comprising a frame having coupling means for connection to a p.t.o. of a prime mover, a supporting beam and a plurality of rotors being mounted on said supporting beam means that extends laterally from said coupling means, said rotors being rotatable about corresponding upwardly extending axes that are substantially parallel to one another and driving means connected to rotate said rotors about their axes, said driving means including gears that transmit a relative high speed of rotation from the p.t.o. to said rotors, said rotors each comprising a hub, a shaft extending from each said gear and cutting member assembly on said shaft, said assembly including a blade that is eccentric and pivoted to the hub, said rotor comprising balancing means which balances the center of gravity of said assembly with respect to the axis of rotation of said rotor.

8. A mowing machine as claimed in claim 7, wherein a gear on said shaft is located beneath the blade of said rotor and said gear has at least one hole or recess forming said balancing means.

9. A mowing machine as claimed in claim 7, wherein said rotors are arranged closely adjacent one another and the blades of neighboring rotors are angularly spaced apart from one another about their corresponding axes of rotation.

10. A mowing machine as claimed in claim 9, wherein the angular spacing between the blades of neighboring rotors is about 50°.

11. A mowing machine as claimed in claim 9, including a mounting plate in said beam, wherein said rotors are mounted on a mounting plate of said beam that is movable over the ground during the operation of the machine, said mounting plate having an upwardly inclined front side with respect to the direction of travel, the points of connection of said blades to their corresponding hubs being located behind the front of said mounting plate as seen in plan with respect to the direction of travel.

12. A mowing machine as claimed in claim 11, wherein, as seen in plan view, said mounting plate has a substantially straight leading edge.

13. An implement as claimed in claim 11, wherein at least a leading portion of said mounting plate has a channel-shaped configuration when viewed in section.

14. A mowing machine as claimed in claim 13, wherein a rearmost portion of said mounting plate has an inverted channel configuration.

15. A mowing machine as claimed in claim 14, wherein an extreme rearmost portion of said mounting plate is substantially horizontal.

16. A mowing machine as claimed in claim 7, wherein the hubs of said rotors are mounted on respective shafts housed in at least one gear box and the front and/or the rear of said gear box is mounted on at least one support that contacts the ground surface during operation.

17. A mowing machine as claimed in claim 7, wherein each blade has a length of about ten centimeters.

18. A mowing machine as claimed in claim 17, wherein the axes of rotation of immediately neighboring rotors are spaced apart from one another by a distance of about fifteen centimeters.

19. A mowing machine as claimed in claim 13, wherein said channel-shaped portion has a width that is approximately equal to the distance between the axes of rotation of two immediately neighboring rotors.

20. A mowing machine as claimed in claim 18, wherein said mounting plate has a fore and aft width of about twenty-five centimeters.

21. A mowing machine as claimed in claim 20 wherein the speed of revolutions of each rotor is between about 8,000 and 10,000 r.p.m.

* * * * *